United States Patent [19]

Chang et al.

[11] Patent Number: 4,643,886

[45] Date of Patent: Feb. 17, 1987

[54] AUTOMATIC PH CONTROL IN A PROCESS FOR REMOVAL OF HYDROGEN SULFIDE FROM A GAS

[75] Inventors: Dane Chang, Houston; Stephen A. Bedell, Lake Jackson, both of Tex.

[73] Assignee: The Dow Chemical Company, Midland, Mich.

[21] Appl. No.: 805,672

[22] Filed: Dec. 6, 1985

[51] Int. Cl.$^4$ .................... C01B 17/16; C01B 31/20; C25B 1/02
[52] U.S. Cl. .................................. 423/226; 204/129
[58] Field of Search ...................... 423/226; 204/129

[56] References Cited

U.S. PATENT DOCUMENTS

| 4,436,711 | 3/1984 | Olson | 423/226 |
| 4,436,712 | 3/1984 | Olson | 423/226 |
| 4,436,713 | 3/1984 | Olson | 423/226 |
| 4,436,714 | 3/1984 | Olson | 423/226 |
| 4,443,423 | 4/1984 | Olson | 423/226 |
| 4,443,424 | 4/1984 | Olson | 423/226 |

Primary Examiner—John Doll
Assistant Examiner—Lori S. Freeman
Attorney, Agent, or Firm—Benjamin G. Colley

[57] ABSTRACT

A method for removing hydrogen sulfide from a gaseous stream by contacting the gaseous stream with a polyvalent metal chelate present in an aqueous alkaline scrubbing solution including the regeneration of the polyvalent metal chelate in an electrolytic cell and automatic control of the pH of said aqueous alkaline scrubbing solution at about 7 to 9.

10 Claims, 1 Drawing Figure

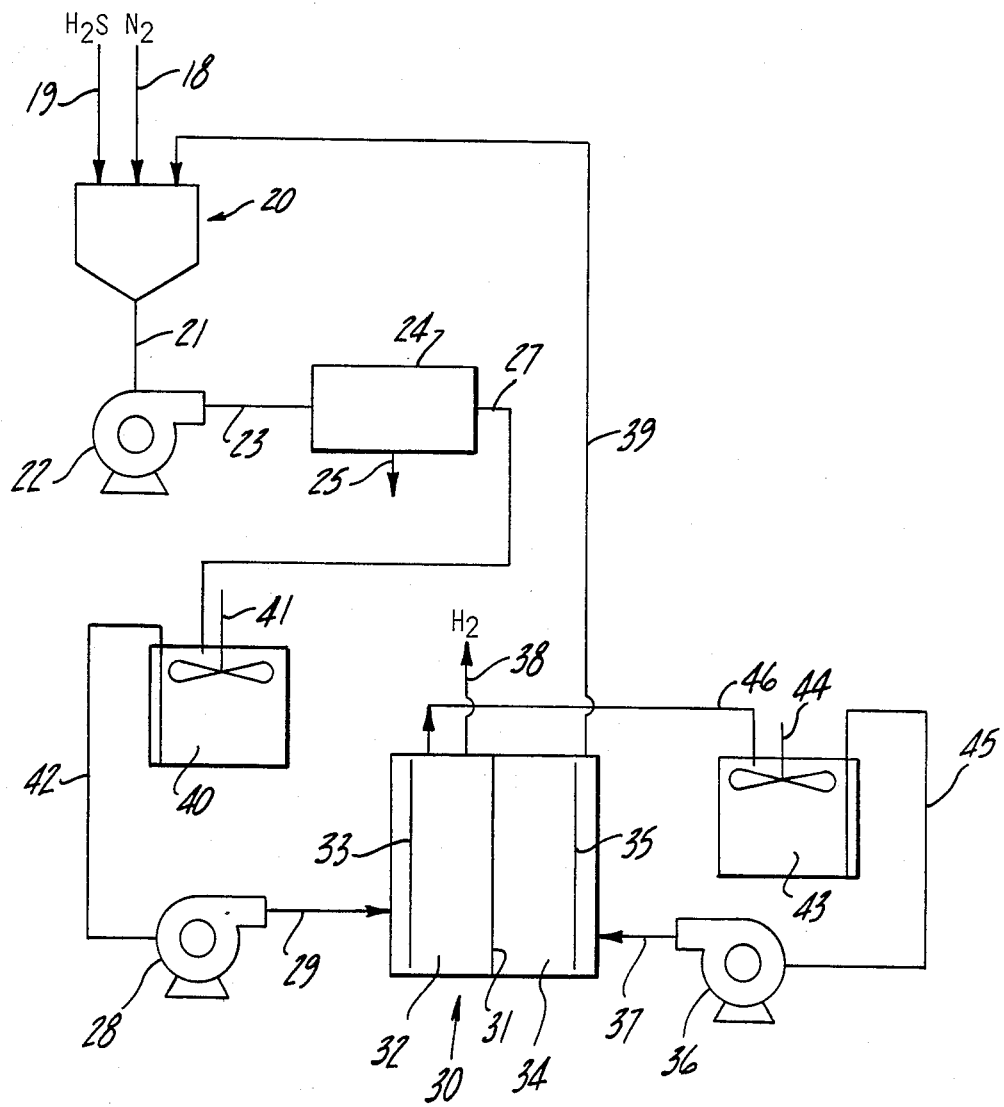

AUTOMATIC PH CONTROL IN A PROCESS FOR REMOVAL OF HYDROGEN SULFIDE FROM A GAS

BACKGROUND OF THE INVENTION (1) Field of the Invention

The present invention relates generally to a process for the removal of hydrogen sulfide from gases utilizing a polyvalent metal chelate in an aqueous alkaline scrubbing solution.

(2) Description of the Prior Art

Processes for the removal of hydrogen sulfide from gases utilizing a polyvalent metal chelate to oxidize the hydrogen sulfide to sulfur with electrolytic oxidation of the reduced polyvalent metal chelate back to the original valence state suffer from two basic problems: (1) The polyvalent metal chelate is unstable under the process conditions and tends to degrade and become ineffective and (2) the maintenance of pH at an optimum of about 7-9 in an aqueous alkaline scrubbing solution in which the hydrogen sulfide gas is absorbed. The latter usually requires the addition of an alkali to compensate for the reduction in pH which tends to occur as the result of the absorption of hydrogen sulfide (an acid gas).

In U.S. Pat. No. 4,436,711 and U.S. Pat. No. 4,436,714, a fuel cell is disclosed as useful to regenerate a polyvalent metal chelate utilized in an aqueous alkaline solution to remove hydrogen sulfide from a gaseous stream. The polyvalent metal chelate is changed from the lower valence state to the higher valence state by regeneration. In U.S. Pat. No. 4,443,423, and U.S. Pat. No. 4,443,424, a process is described in which a gaseous stream containing hydrogen sulfide is led directly to the anode of an electrochemical cell which functions as a contact zone for removal of hydrogen sulfide from the gaseous stream.

None of these references have as their objects and purposes the control of pH in the contact zone of the process at an optimum level for maximum efficiency of a process for removal of hydrogen sulfide from a gaseous stream utilizing a polyvalent metal chelate in an aqueous solution. In addition, none of the prior art recognizes the degradation effect that hydroxyl radicals have upon the polyvalent metal chelate.

To date the only method known to counteract the tendency toward a reduced pH by the absorption of the acid gas, hydrogen sulfide has been the use of buffering agents or the controlled addition of an alkali such as sodium hydroxide to maintain the pH at acceptable levels of between 7 and 9. At pH levels beyond 9 the polyvalent metal chelate is rendered unstable and at pH levels below 7, the aqueous alkaline solution containing a polyvalent metal chelate is able to absorb substantially less hydrogen sulfide from the gaseous stream since there is insufficient residual hydroxyl ion to neutralize the acidity introduced by the absorption of the hydrogen sulfide.

SUMMARY OF THE INVENTION

In accordance with the present invention, it has now been found that the pH of an aqueous alkaline scrubbing solution containing an effective amount of a polyvalent metal chelate in a higher valence state, which is utilized to remove hydrogen sulfide from a gaseous stream, as shown in equation (1)

$$2Fe^{(III)}\text{chelate} + H_2S \rightarrow 2Fe^{(II)}\text{chelate} + S\downarrow + 2H^+ \tag{1}$$

can be automatically maintained at an optimum pH of about 7 to 9 while regenerating the polyvalent metal chelate in an electrolytic cell. Said aqueous alkaline solution contains, subsequent to scrubbing a hydrogen sulfide containing gas in a contact zone, a polyvalent metal chelate substantially in the reduced or lower valence state.

In the electrolytic cell, which is connected to an external electrical circuit and contains a permselective cell membrane, the aqueous alkaline solution is first passed to the cathode compartment as electrolyte and thereafter to the anode compartment of the electrolytic cell. In the cathode compartment of the cell, the polyvalent metal chelate which is in the reduced or lower valence state is not further reduced. Any polyvalent metal chelate present in the oxidized or higher valence state is reduced together with hydrogen being produced at the cathode from the reduction of $H_2O$ as shown in equation (2).

$$2H_2O + 2e \rightarrow H_2\uparrow + 2OH^- \tag{2}$$

Hydroxide ions are obtained during electrolysis in the electrolyte contained in the cathode compartment. The electrolyte from the cathode compartment is subsequently passed to the anode compartment of the electrolytic cell where the polyvalent metal chelate is oxidized to the higher valence state as shown in equation (3).

$$2Fe^{(II)}\text{chelate} \rightarrow 2Fe^{(III)}\text{chelate} + 2e \tag{3}$$

Subsequent to oxidation of the polyvalent metal chelate, the electrolyte is recycled to the contact zone for further use in removing hydrogen sulfide from the gaseous stream. In order to prevent the passage of electrons between the anode and cathode except through the cell membrane, two vessels in which stirrers are installed, are placed at the inlets of the anolyte and catholyte compartments in order to create intermittent solution flow into the anolyte and catholyte compartments. Since the electrolysis of the water in the aqueous alkaline solution in the cathode compartment of the cell has provided additional hydroxide ions in the electrolyte, these hydroxide ions which pass with the electrolyte back to the contact zone are available to neutralize the acidity produced by the absorption of hydrogen sulfide in the contact zone. Thus the added hydroxide ions counteract the reduction in pH which would normally occur had no additional hydroxide ions been added to the electrolyte. In addition, it has been found that polyvalent metal chelate degradation can be further reduced by maintaining a nitrogen blanket in the contact zone. By excluding the contact of air with the iron chelate in the reduced valence state, the generation of hydroxyl radicals is minimized thus minimizing the degradation of the polyvalent metal chelate.

BRIEF DESCRIPTION OF THE DRAWING

The FIGURE is a flow sheet for one embodiment of the process of the invention illustrating the combined removal of hydrogen sulfide from a gaseous stream to produce crystalline sulfur and the regeneration in an electrolytic cell of the aqueous alkaline solution containing a polyvalent metal chelate.

DETAILED DESCRIPTION OF THE INVENTION

A process is disclosed for the removal of hydrogen sulfide from a gaseous stream and conversion to elemental sulfur. The hydrogen sulfide containing gas is contacted in a contact zone with an aqueous alkaline solution containing a polyvalent metal chelate in the oxidized or higher valence state. The pH of the aqueous alkaline solution is automatically maintained at an optimum level of about 7 to about 9 by the addition of hydroxide ions to said aqueous alkaline solution during regeneration of the polyvalent metal chelate in an electrolytic cell. Recycling said aqueous alkaline solution back to said contact zone allows automatic control of pH in said contact zone since the added hydroxide ions present neutralize the acidity introduced by the absorption of hydrogen sulfide. For optimum results the process is conducted under a nitrogen blanket to avoid the formation of hydroxyl radicals which promote the decomposition of the polyvalent metal chelate.

The particular type of gaseous stream treated is not critical, as will be evident to those skilled in the art. Streams particularly suited to removal of $H_2S$ by the practice of the invention are naturally-occurring gases, synthesis gases, refinery process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. The amount of $H_2S$ present is not generally a limiting factor in the practice of the invention.

Temperatures employed in the contact zone wherein hydrogen sulfide is absorbed utilizing an aqueous alkaline solution are not generally critical, except that the reaction is carried out at a temperature below the melting point of sulfur. The preferred operating range temperature is from about 10° centigrade to about 70° centigrade. The most preferred temperature range is from about 25° to about 50° centigrade. At higher temperatures the rate of polyvalent metal chelate degradation increases to unacceptable levels. At lower temperatures, reaction kinetics slow down while hydrogen sulfide absorption increases, which can cause a chemical imbalance to occur. In addition, at lower temperatures soluble components of the aqueous alkaline solution may be precipitated from solution. Contact times in the contact zone can range from about 1 second to about 270 seconds or longer, with contact times of 2 seconds to 120 seconds being preferred.

The operating range for pH is from about 6 to about 10. The preferred range is from about 7 to about 9 and the most preferred range of pH is from about 8 to about 9. In general, the highest pH possible is preferred in order to operate at a high efficiency of hydrogen sulfide absorption. Since hydrogen sulfide is an acid gas, the aqueous alkaline solution upon absorption of the hydrogen sulfide is lowered in pH. The optimum pH depends upon the particular polyvalent metal chelating agent, particularly the polyvalent metal utilized therein. The ability of the polyvalent metal chelating agent to protect the metal from precipitation as an insoluble sulfide or hydroxide at high pH values will determine how high in pH the aqueous alkaline solution can be used. At pH values below about 6, the efficiency of hydrogen sulfide absorption is so low as to be impractical. At pH values greater than 10, the precipitation of insoluble iron hydroxide occurs resulting in decomposition of the polyvalent metal chelating agent.

In the process of the invention, the pH of the aqueous alkaline solution utilized in the contact zone is maintained at an optimum pH of about 7 to about 9, more nearly a pH of about 8 to about 9. A key feature of the process of the invention lies in the manner in which the regeneration of the reduced polyvalent metal chelate or chelates is carried out. In one embodiment of the invention, a suitable electrode or electrodes are maintained in an electrolytic cell, preferably at some finite distance from the site of the contact zone wherein the hydrogen sulfide is absorbed from the gaseous stream utilizing an aqueous alkaline solution containing a polyvalent metal chelate. The electrolytic cell is energized using a direct current source connected through an external circuit and the regeneration of polyvalent metal chelate is carried out continuously as is the absorption of the hydrogen sulfide in the contact zone.

The aqueous alkaline solution is led to a separation zone in which the elemental sulfur in said aqueous alkaline solution is recovered by any of the conventional separation processes known for recovery of elemental sulfur from aqueous solutions. For example, sulfur can be recovered by flocculation and settling, centrifugation, filtration, flotation, and the like. The method of sulfur recovery is not critical to the process of the invention. It is desirable to also recover as much of the aqueous alkaline solution as possible to minimize physical losses of the polyvalent metal chelating agent.

The aqueous alkaline solution is thereafter passed as an electrolyte to the cathode compartment of an electrolytic cell containing a permselective cell membrane wherein the water contained in said aqueous alkaline solution is electrolyzed. Hydrogen is obtained at the cathode of the cell while hydroxide ions are produced within the catholyte contained in the cathode compartment. Thereafter, the catholyte containing the polyvalent metal chelate in the reduced or lower valence state is passed to the anode compartment of the electrolytic cell where the polyvalent metal chelate is oxidized to the higher valence state. Thereafter, the electrolyte is returned to the contact zone. The presence of additional hydroxide ions in the aqueous alkaline solution subsequent to the electrolytic reduction of water in the cathode compartment of the electrolytic cell provides a means of counteracting the tendency of the aqueous alkaline solution utilized in the contact zone to be reduced in pH as hydrogen sulfide is absorbed from the gaseous stream.

Any oxidizing polyvalent metal chelating agent can be used but those in which the polyvalent metal is iron, copper, and manganese are preferred, particularly iron. Other useful metals which can provide the polyvalent metal of the polyvalent metal chelating agent are generally those that are capable of undergoing a reduction oxidation reaction, that is, those metals capable of being reduced to a lower valence state by reaction with hydrosulfide or sulfide ions and which can be regenerated by oxidation with an oxygen containing gas to a higher valence state. Specific examples of useful metals include, besides the preferred metals listed above, nickel, chromium, cobalt, tin, vanadium, platinum, palladium, and molybdenum. The metals are normally supplied as a salt, oxide, hydroxide, etc.

The preferred polyvalent metal chelates are coordination complexes in which the polyvalent metals form chelates generally by reaction with an amino carboxylic acid, an amino polycarboxylic acid, a polyamino carboxylic acid, or a polyamino polycarboxylic acid. Preferred coordination complexes are those polyvalent metals which form chelates with an acid having the formula:

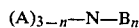

where n is two or three; A is a lower alkyl or a hydroxyalkyl group; and B is a lower alkyl carboxylic group.

A second class of preferred acids utilized in the formation of the polyvalent metal chelating agents utilized in the process of the invention is an acid represented by the formula:

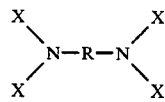

wherein two to four of the X groups are lower alkyl carboxylic groups, zero to two of the X groups are selected from the group consisting of lower alkyl groups, hydroxyalkyl groups, and

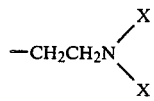

and wherein r is a divalent organic group. Representative divalent organic groups are ethylene, propylene, isopropylene or alternatively cyclohexane or benzene groups where the two hydrogen atoms replaced by nitrogen are in the one or two position and mixtures thereof.

The polyvalent metal chelates useful in the process of the invention are readily formed in an aqueous medium by reaction of an appropriate salt, oxide, or hydroxide of the polyvalent metal and an amino carboxylic acid present in the acid form or as an alkali metal or ammonum salt thereof. Exemplary amino carboxylic acids include (1) amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; (2) amino acetic acids derived from ethylene diamine, diethylene triamine, 1,2-propylene diamine, and 1,3-propylene diamine, such as EDTA (ethylene diamine tetraacetic acid), HEDTA (2-hydroxyethyl ethylene diamine tetraacetic acid), DTPA (diethylene triamine pentaacetic acid); and (3) amino acetic acid derivatives of cyclic 1,2-diamines, such as 1,2-diamino cyclohexane N,N-tetraacetic acid, and 1,2-phenylenediamine-N,N-tetraacetic acid. The iron chelates of NTA and 2-hydroxyethyl ethylene diamine triacetic acid are preferred. The polyvalent metal chelates are used in the contact zone of the process generally in an effective amount suitable for oxidizing substantially all the hydrogen sulfide removed from the hydrogen sulfide containing gas scrubbed in the contact zone of the process by the aqueous alkaline scrubbing solution. Preferably the effective amount is about 2 moles to about 10 moles of polyvalent metal chelate per mole of hydrogen sulfide absorbed by the aqueous alkaline solution, although an amount up to the solubility limit of the polyvalent metal chelate in the aqueous alkaline solution can be used. Most preferably about 2 moles to about 5 moles of polyvalent metal chelate per mole of absorbed hydrogen sulfide is used.

The buffering agents which are useful as optional components of the aqueous alkaline scrubbing solution of the invention are in general those which are capable of stabilizing the aqueous alkaline solution to a pH in the desired operating pH range of about 6 to about 10. The buffering agents should be water soluble at the concentrations in which they are effective. Examples of suitable buffering agents optionally used in the process of the invention are the alkali metal salts of carbonates, bicarbonates, or borates. Examples of useful specific buffering agents within these classes of buffering agents are sodium carbonate-bicarbonate or sodium borate. Where the hydrogen sulfide containing feed gas also contains carbon dioxide at a volume percent of greater than about 5%, the carbonate-bicarbonate buffers are the preferred buffers for use in the process of the invention. These may be produced in situ by the addition of a base such as sodium hydroxide in the preparation of the aqueous alkaline scrubbing solution. Where the hydrogen sulfide containing feed gas contains carbon dioxide only in a minor amount, (less than about 5%) then the borate buffers, for example, borax or sodium borate ($Na_2B_4O_7$) are useful.

Hydrogen sulfide absorbents can be employed in the contact zone to increase the absorptivity of the aqueous alkaline solution. Any of the known absorbents conventionally used which do not affect the activity of the polyvalent metal chelate can be used. The hydrogen sulfide solvent can be either a physical solvent or a regenerable chemical solvent but a physical solvent is preferred. The vapor pressure of the hydrogen sulfide solvent should be low enough so that it is not stripped from the solution in substantial amounts during the contact stage of the process or during the oxidation stage of the process. The hydrogen sulfide solvent can be either an organic or an inorganic solvent or a solvent which, in combination with the aqueous alkaline solution, increases the solubility of the combined solution with respect to hydrogen sulfide. Examples of suitable hydrogen sulfide solvents are as follows: tripotassium phosphate, tributyl phosphate, tetrahydrothiophene dioxide, dimethyldithiodipropionate, N-methyl-2-pyrrolidone, N-methylpyrrolidine, N-formylmorpholine, N-formyldimethylmorpholine, N,N-dimethylformamide, propylene carbonate, dialkyl ethers of polyethylene glycols, and dimethyl or diethyl glycine salts. The particular hydrogen sulfide absorbent chosen is a matter of choice given the qualifications that the hydrogen sulfide solvent must not effect the activity of the polyvalent metal chelate and the hydrogen sulfide solvent must exhibit sufficient solubility for hydrogen sulfide.

DETAILED DESCRIPTION OF THE DRAWING

In the FIGURE there is shown a flow sheet for one embodiment of the process of the invention. A hydrogen sulfide containing gaseous stream enters the contact zone 20 through line 19. An aqueous alkaline solution containing a polyvalent metal chelate contacts the gaseous stream containing hydrogen sulfide. Contact zone 20 is maintained under an atmosphere of nitrogen which enters through line 18 so as to reduce the degradation of the polyvalent metal chelate caused by the formation of hydroxyl radicals. The aqueous alkaline solution containing crystalline sulfur and polyvalent metal chelate substantially in the reduced or lower valence state is led through line 21 by way of pump 22 and line 23 to sulfur recovery zone 24. Sulfur is removed at 25. The substantially sulfur free aqueous alkaline solution is led through line 27 to vessel 40 equipped with stirrer 41 and then exits through line 42 and is led by way of pump 28 and line 29 to the cathode compartment 32 of an electrolytic cell 30 containing a permselective membrane 31. The water contained in the aqueous alkaline solution is electrochemically reduced to produce hydrogen at the cathode 33 of said cell and hydroxide ions in the aqueous alkaline catholyte solution contained in cathode compartment 32. Hydrogen is removed through line 38. Thereafter, the electrolyte is led through line 46 to vessel 43 equipped with stirrer 44 and then exits through line 45 and is led by way of pump 36 and line 37 to the anode compartment 34 containing anode 35 at which the polyvalent metal chelate is oxidized to the higher valence state. Electrolyte mixing vessels 40 and 43 are used to prevent the passage of electrons through the electrolyte without stopping the flow of electrolyte. Stirrers 41 and 44 create electrolyte scattering and thus create intermittent flow of electrolyte into the anolyte and catholyte cell compartments. The oxidized aqueous alkaline solution from anolyte compartment 34 is returned through line 39 to the contact zone 20 for further absorption of hydrogen sulfide from the gaseous stream entering the contact zone 20 through line 19. The recycled aqueous alkaline solution is enriched with hydroxide ions and contains regenerated polyvalent metal chelate in the higher valence state.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE 1

In order to illustrate the process of the invention in accordance with the FIGURE, 150 milliliters of a 5% solution of ferric nitrate was complexed with hydroxyethyl ethylene diamine tetraacetic acid (HEDTA) and the solution was diluted to 4,500 milliliters. Potassium dibasic phosphate ($K_2HPO_4$) and sodium borate ($Na_2B_4O_7$) were added to the diluted solution to maintain the pH at 8.7. Hydrogen sulfide was introduced into a gas/liquid contact zone shown in the FIGURE as 20 at a rate of 1 cubic inch per minute. The ferric HEDTA catalyzes the oxidation of the hydrogen sulfide to elemental sulfur and at the same time is reduced to the ferrous state. The aqueous alkaline solution is thereafter pumped through a filter 24 in order to collect the sulfur present in said solution. The substantially sulfur free aqueous solution containing ferrous HEDTA is thereafter passed through the cathode chamber 32 of an electrolytic cell 30 containing a permselective membrane 31. Water is electrochemically reduced to produce hydrogen and hydroxide ions in the cathode chamber 30 of the cell, in accordance with equation (2). Hydrogen is removed through line 38 and the electrolyte is then passed to the anode compartment 34 of the cell where the ferrous HEDTA is oxidized to ferric HEDTA and thereafter the electrolyte is recycled to the contact zone 20. The pumps utilized in the process have the same rate of flow, namely 250 milliliters per minute. The electrolytic cell is made of plexiglass and has an anode of porous graphite measuring 3 inches by 3 inches by 1 inch. The cathode is made of nickel mesh measuring 3 inches by 3 inches. The anode and cathode of the cell are separated by a permselective membrane sold under the trademark NAFION ® 324. A direct current power supply is used to provide a potential/current of 4 volts/2 amps across the cell. The process was run for a period of 24 hours utilizing a nitrogen atmosphere in the contact zone 20 as well as in vessels 40 and 43. Twenty-five grams of sulfur were produced and the aqueous alkaline solution in the contact zone was maintained at the initial pH of 8.7.

EXAMPLE 2

Example 1 was repeated except that vessels 40 and 43 were bypassed. Only 3.8 grams of sulfur were produced. The initial pH of 8.6 was maintained substantially unchanged over the period in which the process was run.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or priviledge is claimed are defined as follows:

1. A continuous process for removing hydrogen sulfide from a sour gaseous stream comprising:
    (A) contacting said sour gaseous stream in a contact zone with a first aqueous alkaline solution at a temperature below the melting point of sulfur, said solution comprising at least one polyvalent metal chelate in a higher valence state in an effective amount suitable for oxidizing substantially all the hydrogen sulfide removed from said gaseous stream to produce a sweet gaseous stream, a second aqueous alkaline solution comprising sulfur, and at least one polyvalent metal chelate in a lower valence state;
    (B) separating in a separation zone said sulfur from said second aqueous alkaline solution;
    (C) passing said second aqueous alkaline solution as an electrolyte from said separation zone to a cathode compartment of an electrochemical cell, said cell comprising an anode in an anode compartment and a cathode in said cathode compartment, said compartments separated by a cell membrane and said anode and cathode connected through an external electrical circuit;
    (D) producing said first aqueous alkaline solution by passing said second aqueous alkaline solution from said cathode compartment to said anode compartment and oxidizing at said anode said polyvalent metal chelate to a higher valence state while producing hydrogen at said cathode and hydroxide ions in said electrolyte; and (E) recycling said first aqueous alkaline solution from said electrochemical cell to said contact zone;

whereby the pH of said first aqueous alkaline solution is maintained in said contact zone at about 7 to about 9.

2. The process of claim 1 wherein the process is conducted in said contact under a nitrogen blanket to prevent the formation of hydroxyl radicals and the degradation of the polyvalent metal chelate.

3. The process of claim 2 wherein the flow of electrons to said cathode and said anode is prevented by using electrolyte mixing vessels to create intermittent electrolyte flow.

4. The process of claim 3 wherein said effective amount of said polyvalent metal chelate in the higher valence state is about 2 moles to about 10 moles of polyvalent metal chelate per mole of the hydrogen sulfide absorbed.

5. The process of claim 4 wherein said polyvalent metal in said chelate is any oxidizing polyvalent metal capable of oxidizing hydrogen sulfide while being reduced itself from a higher to a lower valence state when present in a coordination complex in which said polyvalent metal forms a chelate with at least one of an acid selected from the group consisting of an amino carboxylic acid, an amino polycarboxylic acid, a polyamino carboxylic acid, and a polyamino polycarboxylic acid.

6. The process of claim 5 wherein said amino polycarboxylic acid is represented by the formula:

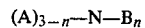

wherein n is two or three; B is a lower alkyl carboxylic acid group; and A is a lower alkyl or a hydroxyalkyl group.

7. The process of claim 6 wherein said amino polycarboxylic acid is represented by the formula:

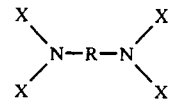

wherein X is selected from a lower alkyl carboxylic acid group, a lower alkyl group, and a hydroxyalkyl group, and

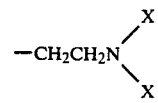

and R is a divalent organic group.

8. The process of claim 5 wherein said amino carboxylic acid is selected from the group consisting of amino acetic acids (1) derived from ammonia or 2-hydroxy alkyl amines, or (2) derived from ethylene diamine, diethylene triamine, 1,2-propylene diamine, or 1,3-propylene diamine, or (3) derived from amino acetic acid derivatives of cyclic 1,2-diamines.

9. The process of claim 7 wherein said amino polycarboxylic acid is selected from the group consisting of ethylenediamine tetraacetic acid, N-(2-hydroxyethyl)ethylenediamine triacetic acid and said metal forming a coordination complex with said amino polycarboxylic acid is selected from the group consisting of iron, manganese, copper, nickel, chromium, cobalt, tin, vanadium, platinum, palladium, molybdenum, and mixtures thereof.

10. The process of claim 9 wherein said metal is iron.

* * * * *